United States Patent
Weber

(10) Patent No.: US 11,915,056 B2
(45) Date of Patent: Feb. 27, 2024

(54) COMBINATION OF MULTIPLE DATA PROCESSING AND MACHINE LEARNING FRAMEWORKS FOR A TARGET HARDWARE

(71) Applicant: NEC Laboratories Europe GmbH, Heidelberg (DE)

(72) Inventor: Nicolas Weber, Dossenheim (DE)

(73) Assignee: NEC CORPORATION, Tokyo (JP)

( * ) Notice: Subject to any disclaimer, the term of this patent is extended or adjusted under 35 U.S.C. 154(b) by 704 days.

(21) Appl. No.: 17/070,962

(22) Filed: Oct. 15, 2020

(65) Prior Publication Data
US 2022/0121498 A1 Apr. 21, 2022

(51) Int. Cl.
G06F 9/50 (2006.01)
G06F 9/54 (2006.01)
G06F 9/38 (2018.01)

(52) U.S. Cl.
CPC .......... *G06F 9/5044* (2013.01); *G06F 9/3836* (2013.01); *G06F 9/5016* (2013.01); *G06F 9/541* (2013.01)

(58) Field of Classification Search
CPC .............................. G06F 9/5044; G06F 9/5016
See application file for complete search history.

(56) References Cited

U.S. PATENT DOCUMENTS

| 10,204,140 B2 * | 2/2019 | Petride | G06F 16/24553 |
| 2009/0067334 A1 * | 3/2009 | Archer | G06F 9/546 370/238 |
| 2011/0125974 A1 * | 5/2011 | Anderson | G06F 15/17331 711/E12.005 |
| 2011/0238945 A1 * | 9/2011 | Ryu | G06F 12/0223 711/171 |
| 2018/0329958 A1 * | 11/2018 | Choudhury | G06F 16/2456 |
| 2019/0324856 A1 | 10/2019 | Zhao et al. | |
| 2019/0370630 A1 | 12/2019 | Yang | |
| 2020/0057659 A1 | 2/2020 | Sequoia et al. | |

(Continued)

FOREIGN PATENT DOCUMENTS

CN 102546624 A 7/2012
CN 110554913 A 12/2019

(Continued)

OTHER PUBLICATIONS

Weber, Nicolas and Felipe Huici, "SOL: Effortless Device Support for AI Frameworks without Source Code Changes," arXiv:2003.10688v1, Mar. 24, 2020.

(Continued)

*Primary Examiner* — Benjamin C Wu
(74) *Attorney, Agent, or Firm* — Leydig, Voit & Mayer, Ltd.

(57) ABSTRACT

A method for combining multiple different data processing, artificial intelligence and/or machine learning frameworks for execution by a target hardware includes extracting one or more computation graphs from each of the different frameworks. The computation graphs are combined into a fused computation graph. Memcopy operations are removed at edges between the computation graphs of the different frameworks. Memory spaces for computations in the fused computation graph are remapped to memory spaces of the target hardware.

15 Claims, 3 Drawing Sheets

(56) References Cited

U.S. PATENT DOCUMENTS

2022/0100503 A1* 3/2022 Matosevic ............ G06F 15/825
2022/0245009 A1* 8/2022 Vasiljevic ............... G06F 9/547

FOREIGN PATENT DOCUMENTS

CN 109740751 B 4/2020
CN 111078395 A 4/2020

OTHER PUBLICATIONS

Rotem, Nadav et al. "Glow: Graph Lowering Compiler Techniques for Neural Networks," arXiv:1805.00907v3, Apr. 3, 2019.
Weber, Nicolas, "Sol: Transparent Neural Network Acceleration Platform," ACM, SC'18, Dallas, Texas, USA, Nov. 2018.
Jäger, Sebastian et al. "Parallelized Training of Deep NN—Comparison of Current Concepts and Frameworks," ACM, DIDL'18, Rennes, France, Dec. 10-11, 2018.
Li, Mingzhen et al. "The Deep Learning Compiler: A Comprehensive Survey," arXiv:2002.03794v4, Aug. 28, 2020.
Long, Guoping et al. "FusionStitching: Deep Fusion and Code Generation for Tensorflow Computations On GPUs," arXiv:1811.05213v1, Nov. 13, 2018.
Pan, Yuechao et al. "Multi-GPU Graph Analytics," Mar. 2017.
Kessler, Christoph, "Global Optimization of Operand Transfer Fusion in Heterogeneous Computing," May 2019.

* cited by examiner

COMBINATION OF MULTIPLE DATA PROCESSING AND MACHINE LEARNING FRAMEWORKS FOR A TARGET HARDWARE

FIELD

The present invention relates to a method, system and computer-readable medium for compiling multiple data processing, artificial intelligence and/or machine learning source codes (generally referred to herein as frameworks) for a target hardware.

BACKGROUND

There is an ever-increasing number of frameworks being introduced for data processing, artificial intelligence and/or machine learning applications that all provide a Domain Specific Language (DSL)-like programming model. For example, such frameworks include PyTorch, TensorFlow, Pandas and NumPy. Because each of these frameworks has different strengths, it is common that data from one framework can be transferred into another, for example, from PyTorch to NumPy in accordance with the following pseudocode:

```
A = torch.rand(1, 2, 3)    # PyTorch Tensor
B = A.numpy( )             # NumPy Tensor
```

SUMMARY

In an embodiment, the present invention provides a method for combining multiple different data processing, artificial intelligence and/or machine learning frameworks for execution by a target hardware. One or more computation graphs are extracted from each of the different frameworks. The computation graphs are combined into a fused computation graph. Memcopy operations are removed at edges between the computation graphs of the different frameworks. Memory spaces for computations in the fused computation graph are remapped to memory spaces of the target hardware.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
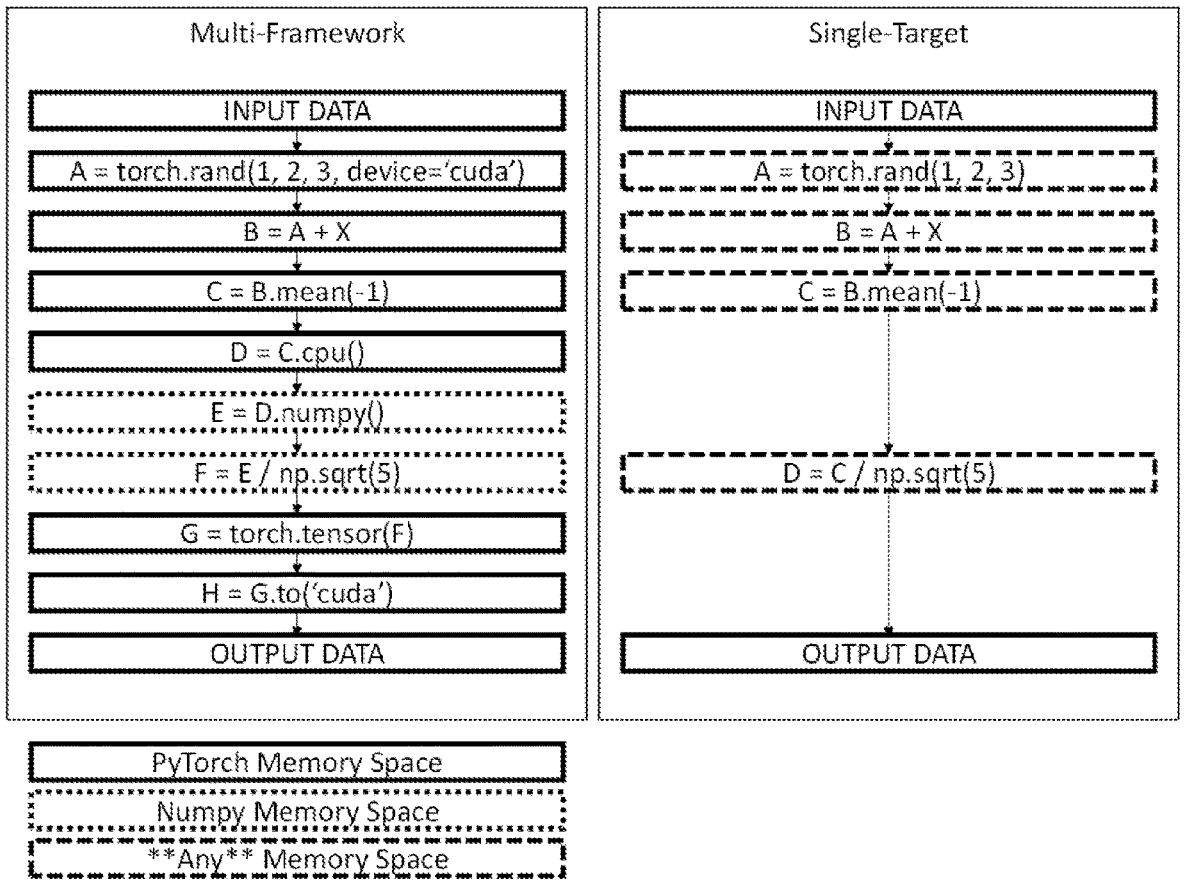
FIG. 1 schematically illustrates an exemplary method for a multi-source to single-target compilation in accordance with an embodiment of the present invention.

Embodiments of the present invention provide a method, system and computer-readable medium to use multiple different frameworks and to compile the underlying computation graph for a target hardware, preferably a single target hardware. Accordingly, embodiments of the present invention enable a user to flexibly work with different frameworks to achieve data processing and/or machine learning applications and functions which could not have been provided prior to the present invention, even on hardware that was not originally intended for one of the frameworks.

Additionally, embodiments of the present invention overcome the problem of separate memory spaces maintained by different frameworks by reassigning computations to other memory spaces and removing unnecessary copy operations. Accordingly, embodiments of the present invention provide for a number of improvements to the operation of the single target hardware running the compiled computation graph including faster computation using reduced computational resources and reduced peak memory consumption.

The inventor has recognized that there are a number of technical challenges which needed to be overcome to be able to combine different frameworks, for example, due to certain incompatibilities among the frameworks and other technical challenges such as those presented in accelerator programming. For example, NumPy only supports central processing unit (CPU) data, and therefore the PyTorch data needs to be transferred to the CPU first. Further, all NumPy operations then run on the CPU, leaving the graphics processing unit (GPU) idle. Although CuPy is a source code which exists for accelerating GPU computing that is compatible with NumPy, the inventor has recognized the problem that using source code such as CuPy results in extensive memcopy operations between the frameworks (e.g., PyTorch GPU→PyTorch CPU→NumPy CPU→CuPy GPU). This problem is rooted in the fact that each framework maintains separate incompatible memory spaces so that data sharing between the frameworks is only possible via copies. CuPy also relies on Compute Unified Device Architecture (CUDA), which is a parallel computing platform and application programming interface (API) model by the company NVIDIA.

Embodiments of the present invention provide for the above-described improvements and overcome the above-described technical problems using a computation graph compiling middleware such as Sol (see, e.g., Weber, Nicolas, "Sol: Transparent Neural Network Acceleration Platform," In Proceedings of SuperComputing (SC' 18), ACM, New York, NY, USA (November 2018), the entire contents of which is hereby incorporated by reference herein) to combine the computation graphs of multiple frameworks into a single graph and then compile this for a target device.

The following is exemplary pseudocode:

```
# load PyTorch
import torch
# load NumPy
import numpy as np
# wrapper function
```

```
def myFunc(X):
    # initialize tensor of size 1 × 2 × 3 with random data on GPU
    A = torch.rand(1, 2, 3, device='cuda')
    # compute C = (A + X) .mean(-1)
    B = A + X
    C = B.mean(-1)
    # copy to CPU
    D = C.cpu( )
    # create a NumPY NDArray from PyTorch Tensor
    E = D.numpy( )
    # compute F = E/sqrt(5)
    F = E/np.sqrt(5)
    # copy data from NumPY NDArray to PyTorch Tensor
    G = torch.tensor(F)
    # copy to GPU
    H = G.to('cuda')
    # return result
    return H
```

The above example generates two random tensors on the GPU, does some arithmetic computations, copies the data to the CPU, copies the data from PyTorch into NumPy memory space, calculates "E/np.sqrt(5)", copies the data back to PyTorch memory space and then to the GPU. The foregoing computation example is simplified to illustrate the principle that multiple frameworks are utilized by users for an application.

With the multi-source to single-target compilation provided by embodiments of the present invention, the memcopies between CPU and GPU, as well as the memcopies between the PyTorch and the NumPy memory space, can be removed.

In an embodiment, the present invention provides a method for combining multiple different data processing and/or machine learning frameworks for execution by a target hardware. One or more computation graphs are extracted from each of the different frameworks. The computation graphs are combined into a fused computation graph. Memcopy operations are removed at edges between the computation graphs of the different frameworks. Memory spaces for computations in the fused computation graph are remapped to memory spaces of the target hardware.

In an embodiment, the method further comprises executing the fused computation graph on the target hardware, wherein an output node of the fused computation graph has a memory space that is the same as a memory space of an output node in a target architecture of the different frameworks.

In an embodiment, the method further comprises inserting a memcopy operation between an input or output node and the rest of the fused computation graph in a case a memory space of the input or output node differs from a target architecture.

In an embodiment, the method further comprises determining memory spaces of input and output nodes in a target architecture of the different frameworks, and setting memory spaces of the input and output nodes in the fused computation graph to match the memory spaces of the input and output nodes in the target architecture.

In an embodiment of the method, at least one of the different frameworks is configured to perform computations on a central processing unit (CPU) and at least one of the different frameworks is configured to perform computations on a graphics processing unit (GPU), and wherein the fused computation graph is configured to perform computations on only one of the CPU and GPU as the target hardware.

In an embodiment of the method, at least one of the frameworks does not support the target hardware.

In an embodiment of the method, the fused computation graph entirely removes dependency on at least one of the different frameworks in a case that input and output nodes of a target architecture are not located on the at least one of the different frameworks.

In another embodiment, the present invention provides a system for combining multiple different data processing and/or machine learning frameworks for execution by a target hardware. The system comprising one or more hardware processors which, alone or in combination, are configured to provide for execution of the following steps: extracting one or more computation graphs from each of the different frameworks; combining the computation graphs into a fused computation graph; removing memcopy operations at edges between the computation graphs of the different frameworks; and remapping memory spaces for computations in the fused computation graph to memory spaces of the target hardware.

In an embodiment, the system comprises a frontend, a core and compiler, and a backend, wherein the computation graphs are extracted from the different frameworks using the frontend which is configured to access memory spaces of the different frameworks, wherein the fused computation graph is formed by the core and compiler which is configured to provide a common computation graph format onto which the computation graphs of the different frameworks are mappable using the frontend, and wherein the backend is configured to execute the fused computation graph using the target hardware.

In an embodiment, the frontend and the backend share a common application programming interface (API), and wherein the backend is configured to ensure that input and output data is located in correct memory spaces of the different frameworks using the common API such that input and output behavior of a target architecture is the same.

In an embodiment, the core and compiler is configured to remap the computations of the fused computation graph to the memory spaces of the target hardware, and wherein either the core and compiler or backend is configured to insert a memcopy operation to an output node of a target architecture in a case that an output node of the fused computation graph differs from the output node of the target architecture.

In an embodiment of the system, at least one of the different frameworks is configured to perform computations on a central processing unit (CPU) and at least one of the different frameworks is configured to perform computations on a graphics processing unit (GPU), and wherein the fused computation graph is configured to perform computations on only one of the CPU and GPU as the target hardware.

In an embodiment of the system, at least one of the frameworks does not support the target hardware.

In an embodiment of the system, the fused computation graph entirely removes dependency on at least one of the different frameworks in a case that input and output nodes of a target architecture are not located on the at least one of the different frameworks.

In a further embodiment, the present invention provides a tangible, non-transitory computer-readable medium having instructions thereon which, upon being executed by one or more processors, alone or in combination, provide for combining multiple different data processing and/or machine learning frameworks for execution by a target hardware according to any method of embodiments of the present invention.

FIG. 1 schematically illustrates an exemplary method for a multi-source to single-target compilation in accordance with an embodiment of the present invention. The example shown in FIG. 1 illustrates differences between multi-framework and single-target computation graphs. In a multi-framework computation graph on the left-hand side of FIG. 1, the transitions of the memory spaces between the frameworks can be easily seen and it is not possible to use any memory space for any of the operations. In contrast, in the single-target computation graph provided by an embodiment of the present invention and shown on the right-hand side of FIG. 1, it can be seen that the middleware provides that any memory space can be used for the computations and that only the input data and the output data are provided within the PyTorch memory space. Thus, in accordance with an embodiment of the present invention, the method only needs to guarantee the input data and output data to be located in the correct memory space, while the computations are independent, which means they can either be offloaded to another device, which implies copies between the memory spaces, or they can be run on the same device, which would yield zero memcopies.

Figure 2:
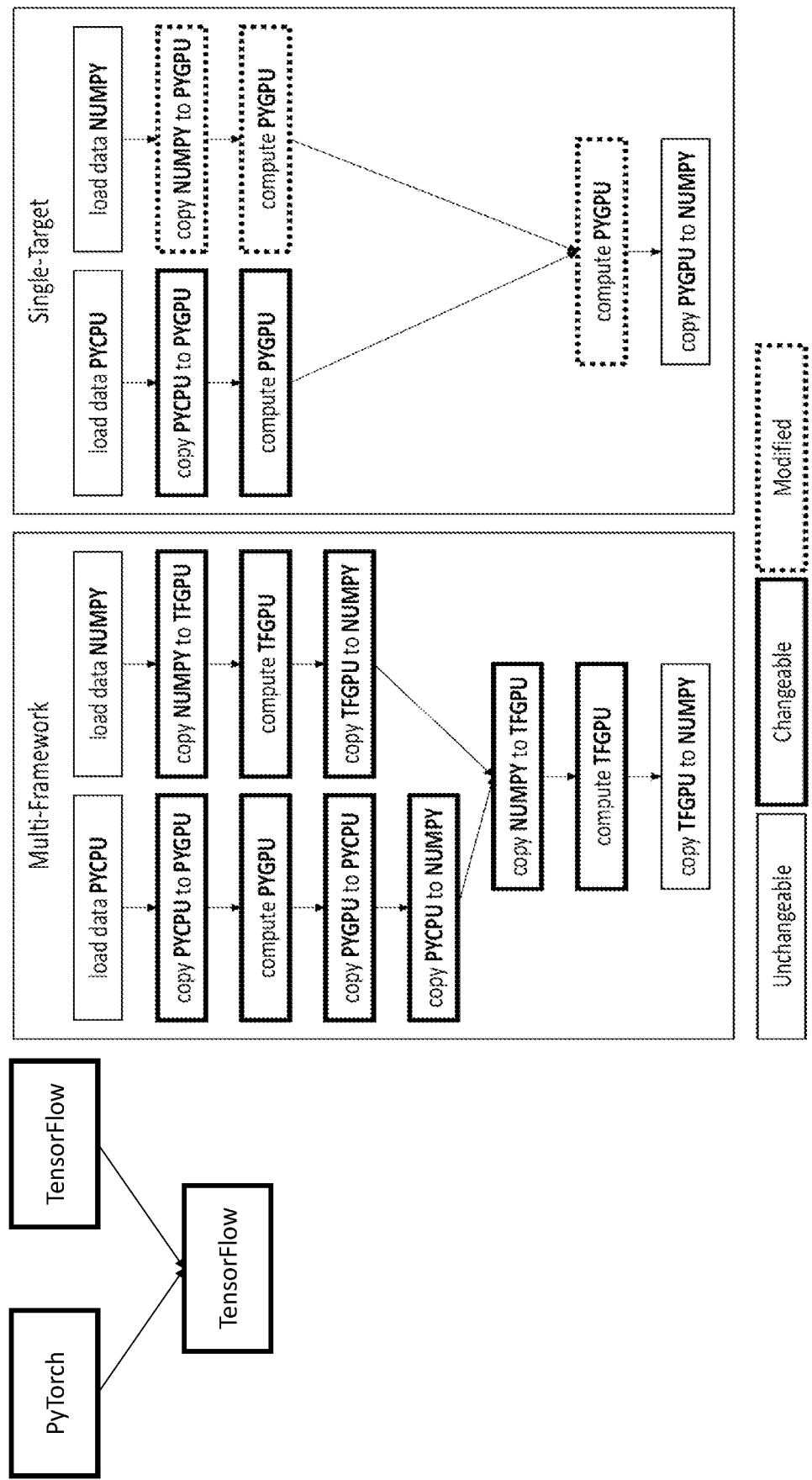
FIG. 2 schematically illustrates an exemplary method for a multi-source to single-target compilation in accordance with an embodiment of the present invention using a more complicated example than that shown used for FIG. 1.

FIG. 2 schematically illustrates a more complicated example with three models (two in TensorFlow and one in PyTorch) used in combination with one another, and shows how the data is passed through the models in the different frameworks. The left-hand side of FIG. 2 is a high level view of the three models and how the data is passed through them. The multi-framework computation graph in the middle of FIG. 2 shows the movement of data between the different memory spaces and devices using the multiple frameworks. The single-target computation graph on the right-hand side of FIG. 2 shows the advantages of providing a fused computation graph for the multiple frameworks. In this example, four movement operations have been removed entirely and three operations have been reassigned to another memory space, for example any memory space.

Accordingly, FIG. 2 illustrates how the method according to an embodiment of the present invention fuses the multiple frameworks into a single execution target, entirely removing the TensorFlow dependency. In particular, the middleware detects that the input is stored on PyTorch-CPU and NumPY-CPU, and that the output is Numpy-CPU. Thus, the middleware can remove the entire TensorFlow dependency. In particular, disjoining the computations (stored in the computation graphs) from the data mapping (which defines on which device the computation is executed) advantageously allows to not only remap computations to different devices, but also to remove entire framework dependencies if they are not needed in the input/output behavior of the neural network model. In contrast to PyTorch, TensorFlow always inputs and outputs data to NumPy, so even where NumPy is not shown in the overview, the intersection between the models is using NumPy. The final single-target model has the identical behavior as it reads data from NumPy and PyTorch and outputs it to NumPy, but it removes several in-host and host-device memcopies.

Prior to application of an embodiment of the present invention, original code is designed to execute the NumPY functions on CPU and the PyTorch functions on GPU. The device according to an embodiment of the present invention executing the fused computation graph is preferably a single device, such as a CPU or GPU or server or computer containing one or more of the same (which allows remove all memcopy operations between devices). Alternatively, optimizing middleware can also be used to run the fused computation graph on different devices. In this case, the middleware can be used to ensure that the final data is located on the device that the user expects it to be such that the input/output behavior is not changed.

Embodiments of the present invention also enable run computations on unsupported hardware. Even though different frameworks usually have a predefined set of supported hardware, embodiments of the present invention can overcome this challenge in order to allow for computations on hardware not intended for one or more of the frameworks (e.g., it can be used to run NumPy workloads on GPUs). Advantageously, embodiments of the present invention provide that the middleware is able to manage the memory space of the single target device on its own. This is especially advantageous when working with frameworks such as NumPy because NumPy does not maintain a GPU memory space which could be used by the middleware.

Data is shared between the frameworks (e.g., using the operation "torch.numpy( )") to syntactically connect the frameworks. Advantageously, NumPy can usually be used for data sharing (e.g., PyTorch>>NumPy>>TensorFlow) as there is no direct way to connect PyTorch and TensorFlow. With an embodiment of the present invention, this could be a NO-OP, while for the traditional execution, it would require at least two memcopies.

Advantageously, embodiments of the present invention provide for the identical input/output behavior while allowing for the above-described improvements. In particular, embodiments of the present invention provide that the input/output data expected by a user application or script (e.g., neural networks programmed in Python use a script file) is placed in the memory space of the given framework and device. This result is ensured by the middleware in accordance with embodiments of the present invention. If the computations are be performed on a different device, the middleware copies data between the computation and the destination device on the entry and exit nodes of the computation graph. In the original user script, the device(s) where computations are executed is hardcoded. With the method according to an embodiment of the present invention, it is reassigned where the computations get executed while also obeying the input/output behavior of the model. Thus, if a user provides data on CPU, but it is desired to execute on GPU as the target hardware, then the data is copied to GPU first. The same applies for the output of the model. If the user expects the data on CPU, then the data needs to be copied from GPU to CPU first by the middleware, so it is guaranteed that the data is on the expected device.

Figure 3:
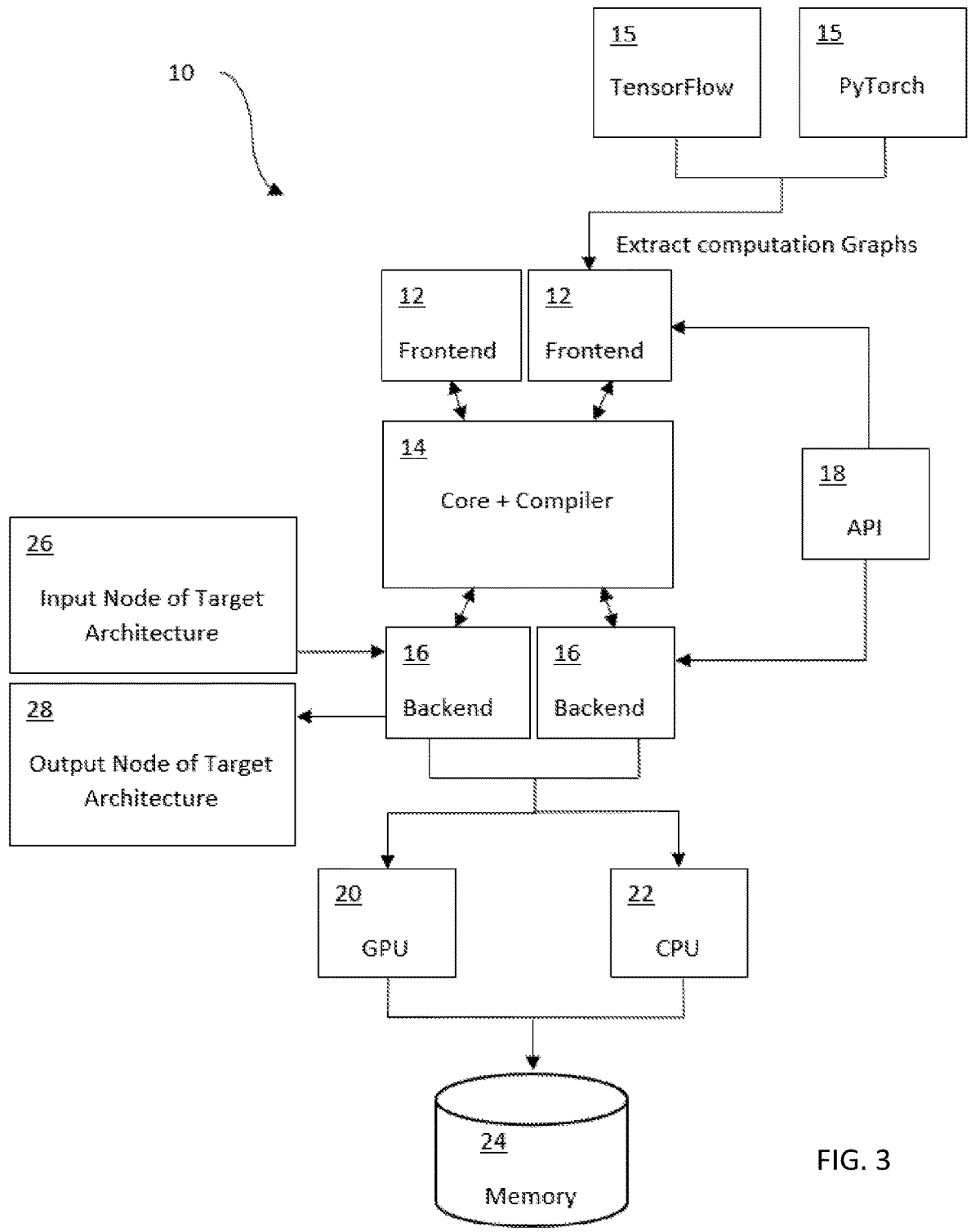
FIG. 3 schematically illustrates a system implementing middleware for compiling to the single target of FIGS. 1 and 2 in accordance with an embodiment of the present invention.

FIG. 3 schematically illustrates an exemplary system 10 for combining multiple frameworks for a single target hardware in accordance with an embodiment of the present invention. The system 10 includes one or more frontends 12, a core and compiler 14 and one or more backends 16. The frontends 12 have two tasks. First, the frontends 12 extract the computation graph of the frameworks 15 into the format of the middleware. To do this, for example in PyTorch, Pytorch function calls are replaced and the neural network is run, wherein the Pytorch function calls are replaced with calls which record all computations that shall be executed. TensorFlow, ONNX and DL4J allow to parse the structure of the neural network through their own API. In some cases, the format does not need to be changed or only slightly adjusted, as there is already some format standardized between the frameworks. However, some frameworks support options that are not available in others. For example, in TensorFlow, a user can assign the padding in pooling layers as "valid" or "same", while in PyTorch it is a numeric value. For Sol, for example, the "valid" and "same" can be replaced with numeric values, as it is easier to process these. Second, the frontends 12 access the memory spaces of the frameworks 15 (usually there are separate memory spaces for each supported device) for read, write, malloc and free operations. This can be done, for example in PyTorch, using an internal API of PyTorch to allocate and free data for all devices (e.g., CPU+GPU). TensorFlow preallocates memory when it calls a layer, so that it is possible to use the pointer that is provided by TensorFlow. NumPy does not have such an API, but rather uses the system allocator (malloc+free) and assigns a destructor to each nd-array that needs to free the data using the correct deallocator. Thus, for example, it is possible to allocate a NumPy array with the PyTorch Memory Allocator. DL4J uses just malloc+free on CPU and cudaMalloc+cudaFree on GPU, so the devices' default allocators can be used in this case. Malloc+free operations using the framework memory spaces are only necessary for the input and output data. While intermediate data can also be put into framework memory spaces, it is not necessary, and it is preferable and advantageous to allow to use any memory space, as discussed herein. For example, the model provides data on PyTorch-CPU and the middleware is programmed to run everything on GPU. In this case, the intermediate data could be put into the PyTorch-GPU memory space, or the default CUDA allocator could be used.

The core and compiler 14 provides a common computation graph format that the frontends 12 can map the framework-specific graphs onto. The framework-specific format is converted into a common format, for example, by the following steps:

1. The frontends 12 extract the computation graphs from the different frameworks.
2. The computation graphs are merged into a fused graph at the boundaries, and the memcopy operations on the boundaries between the different framework's computation graphs are removed.
3. This fused graph then only contains the computational information, and no mapping, and therefore does not know where to execute the computations. The only "mapping" information that is stored is for the input and output nodes, as this is where the user expects the data to be placed.
4. The core assigns the computations to a specific memory space, for example, of memory 24. As discussed above, this could be multiple spaces (for running multiple devices) or a single memory space (for running on a single device). This memory space does not need to be identical to a memory space of the input or output nodes, but if they differ, a memcopy operation is added to ensure the same input/output behavior of the target architecture.

The backends 16 either generate device code for the fused computation graph or execute the fused computation graph via library calls. For example, for executing the fused computation graph, it is possible to compile different code, or call different libraries for each device type. Usually the most computationally intensive functions (e.g., linear or convolutional layers) are available in vendor optimized libraries, which usually outperform any handwritten or generated code. For all the other operations, all frameworks come with their own implementations for each operation and each device. In Sol, there is a code generator engine that can compile these operations to compute functions which perform well for various device types (see, for example, U.S. Patent Application Publication No. 2019/0244091, which is hereby incorporated by reference herein). The backends 16 further ensure that the input/output data is located in the correct memory space of the correct framework and the correct device using information about the memory spaces of the frameworks 15 extracted by the frontends 12 so that the input/output behavior stays the same (e.g., so that the user does not get data on GPU when it is expected on CPU). This is illustrated by the backends 16 using the input node of the target architecture 26 and output node of the target architecture 28 as determined by the frontends 12. For this purpose, a common API 18 is shared between the frontends 12 and backends 16. The backends 16 are connected to the target hardware, such as GPU 20 and CPU 22, either or both of which can be used to execute the fused computation graph as desired, for example using spaces of any memory 24, for example non-volatile device memory of the target hardware.

Thus, embodiments of the present invention provide for the following improvements:

1. Removal of unnecessary memcopies between frameworks resulting in reduced execution time and reduced peak memory consumption. In particular, memcopies between different between memory spaces of different frameworks and devices can be removed by combining the computation graphs of multiple input frameworks into a fused computation graph, and then removing all unnecessary copy operations on the transitions of the old computation graphs. This actually decouples the computations from the memory spaces, allowing the middleware to do a more flexible scheduling. Since copying between different hardware and different memory spaces of the different frameworks is usually quite time-intensive, the present invention enables significantly reduced computation time while using significantly reduced resources to provide for the same input/output data. In particular, the peak memory consumption can be significantly reduced, as a copy always requires 2× memory, in the source and in the target memory space.
2. Enablement to run workloads on unsupported hardware (e.g., NumPy can be run on GPUs even though NumPy only supports CPUs natively).
3. Combination and/or use of different frameworks as desired since a user is able to use and/or combine whatever frameworks the user desires to use and/or is familiar with, independent of hardware constraints.
4. Reduction of integration effort of work done by multiple teams/projects since the middleware, independent of the used frameworks, can translate the computation graphs into one fused graph that can run as a unified computation on the single target hardware.

In an embodiment, the present invention provides a method for combining multiple data processing and/or machine learning frameworks for execution by a single target hardware, the method comprising the following steps:

1. The computation graphs are extracted from the different frameworks.
2. This extracted computation graphs are fused into a single computation graph.
3. All explicit memcopy operations on the edges between the frameworks are removed.
4. All memory space mappings of the computation operations are remapped to a memory space on the target hardware.
5. In the case that the memory space of an input/output node differs from the target architecture, an explicit memcopy is inserted between the node and the rest of the graph. This can be done when the middleware runs the computations on a different hardware (e.g., the user provides and expects the input/output to be on CPU and the middleware executes the computations on GPU, for example to gain computational improvements or other improvements discussed above).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for combining multiple different data processing, artificial intelligence and/or machine learning frameworks for execution by a target hardware, the method comprising:
   extracting one or more computation graphs from each of the different frameworks;
   combining the computation graphs into a fused computation graph;
   removing memcopy operations at edges between the computation graphs of the different frameworks; and
   remapping memory spaces for computations in the fused computation graph to memory spaces of the target hardware.

2. The method according to claim 1, further comprising executing the fused computation graph on the target hardware, wherein an output node of the fused computation graph has a memory space that is the same as a memory space of an output node in a target architecture of the different frameworks.

3. The method according to claim 1, further comprising inserting a memcopy operation between an input or output node and the rest of the fused computation graph in a case a memory space of the input or output node differs from a target architecture.

4. The method according to claim 1, further comprising determining memory spaces of input and output nodes in a target architecture of the different frameworks, and setting memory spaces of the input and output nodes in the fused computation graph to match the memory spaces of the input and output nodes in the target architecture.

5. The method according to claim 1, wherein at least one of the different frameworks is configured to perform computations on a central processing unit (CPU) and at least one of the different frameworks is configured to perform computations on a graphics processing unit (GPU), and wherein the fused computation graph is configured to perform computations on only one of the CPU and GPU as the target hardware.

6. The method according to claim 1, wherein at least one of the frameworks does not support the target hardware.

7. The method according to claim 1, wherein the fused computation graph entirely removes dependency on at least one of the different frameworks in a case that input and output nodes of a target architecture are not located on the at least one of the different frameworks.

8. A system for combining multiple different data processing, artificial intelligence and/or machine learning frameworks for execution by a target hardware, the system comprising one or more hardware processors which, alone or in combination, are configured to provide for execution of the following steps:
   extracting one or more computation graphs from each of the different frameworks;
   combining the computation graphs into a fused computation graph;
   removing memcopy operations at edges between the computation graphs of the different frameworks; and
   remapping memory spaces for computations in the fused computation graph to memory spaces of the target hardware.

9. The system according to claim 8, wherein the system comprises a frontend, a core and compiler, and a backend, wherein the computation graphs are extracted from the different frameworks using the frontend which is configured to access memory spaces of the different frameworks, wherein the fused computation graph is formed by the core and compiler which is configured to provide a common computation graph format onto which the computation graphs of the different frameworks are mappable using the frontend, and wherein the backend is configured to execute the fused computation graph using the target hardware.

10. The system according to claim 9, wherein the frontend and the backend share a common application programming interface (API), and wherein the backend is configured to ensure that input and output data is located in correct memory spaces of the different frameworks using the common API such that input and output behavior of a target architecture is the same.

11. The system according to claim 9, wherein the core and compiler is configured to remap the computations of the fused computation graph to the memory spaces of the target hardware, and wherein either the core and compiler or the backend is configured to insert a memcopy operation to an output node of a target architecture in a case that an output node of the fused computation graph differs from the output node of the target architecture.

12. The system according to claim 8, wherein at least one of the different frameworks is configured to perform computations on a central processing unit (CPU) and at least one of the different frameworks is configured to perform computations on a graphics processing unit (GPU), and wherein the fused computation graph is configured to perform computations on only one of the CPU and GPU as the target hardware.

13. The system according to claim 8, wherein at least one of the frameworks does not support the target hardware.

14. The system according to claim 8, wherein the fused computation graph entirely removes dependency on at least one of the different frameworks in a case that input and output nodes of a target architecture are not located on the at least one of the different frameworks.

15. A tangible, non-transitory computer-readable medium having instructions thereon which, upon being executed by one or more processors, alone or in combination, provide for combining multiple different data processing, artificial intelligence and/or machine learning frameworks for execution by a target hardware by facilitating the following steps:
- extracting one or more computation graphs from each of the different frameworks;
- combining the computation graphs into a fused computation graph;
- removing memcopy operations at edges between the computation graphs of the different frameworks; and
- remapping memory spaces for computations in the fused computation graph to memory spaces of the target hardware.

* * * * *